United States Patent [19]

Fujimori et al.

[11] Patent Number: 4,623,190
[45] Date of Patent: Nov. 18, 1986

[54] MOLDED FENDER FOR AUTOMOBILES

[75] Inventors: Yoshitsugu Fujimori, Saitama; Ryouhei Adachi, Tokyo; Hiroo Ebisawa; Nobuo Kikuchi, both of Saitama; Tsuneyuki Wada, Chiba, all of Japan

[73] Assignee: Honda Giken Kogyo Kabushiki Kaisha, Tokyo, Japan

[21] Appl. No.: 585,985

[22] Filed: Mar. 5, 1984

[30] Foreign Application Priority Data

Mar. 4, 1983 [JP] Japan ................. 58-35625
Mar. 4, 1983 [JP] Japan ................. 58-35626

[51] Int. Cl.$^4$ ............ B62D 25/16; B62D 29/04
[52] U.S. Cl. ................... 296/198; 296/31 P; 296/188; 428/412; 428/157; 264/328.8
[58] Field of Search ........... 296/31 P, 31 R, 194, 296/195, 198, 199, 191, 181, 188, 185, 187; 428/156, 157, 412; 264/328.8

[56] References Cited

U.S. PATENT DOCUMENTS

| Re. 21,850 | 7/1941 | Thomson | 296/31 R |
|---|---|---|---|
| 391,888 | 5/1943 | Schulz | 296/31 P |
| 2,242,269 | 5/1941 | Siebler | 296/31 P |
| 2,326,952 | 8/1943 | Komenda | 296/31 P |
| 2,404,870 | 7/1946 | Ulrich | 296/198 |
| 2,612,964 | 10/1952 | Hobbs | 296/31 P |
| 4,420,452 | 12/1983 | Van Dalen et al. | 264/328.8 |
| 4,478,447 | 10/1984 | Umemoto et al. | 293/102 |

FOREIGN PATENT DOCUMENTS

| 2937399 | 4/1981 | Fed. Rep. of Germany | 296/191 |
|---|---|---|---|
| 843264 | 3/1939 | France | 296/31 P |
| 2063765 | 7/1971 | France | 296/31 P |
| 2360459 | 4/1978 | France | 296/31 P |
| 497103 | 12/1938 | United Kingdom | 296/31 P |
| 2046183 | 11/1980 | United Kingdom | 296/198 |

OTHER PUBLICATIONS

Automobile Engineer, Dec. 1953, pp. 541-549.
Strength of Plastic and Glass, R. N. Haward, 1949, pp. 192-202.

Primary Examiner—Robert B. Reeves
Assistant Examiner—Dennis H. Pedder
Attorney, Agent, or Firm—Lyon & Lyon

[57] ABSTRACT

A front fender for an automobile molded of a synthetic resin in a manner to provide an even flow of the resin to all portions of the fender in order to avoid points of weakness within the fender. The flow starts from numerous points along the fender arched wheel opening and eventually flows through a groove extending to the most radically remote portion of the fender to ensure flow thereto. Thickened cross-sections are formed along the arched wheel opening and the vertical rear edge of the fender for strength and impact resistance.

6 Claims, 9 Drawing Figures

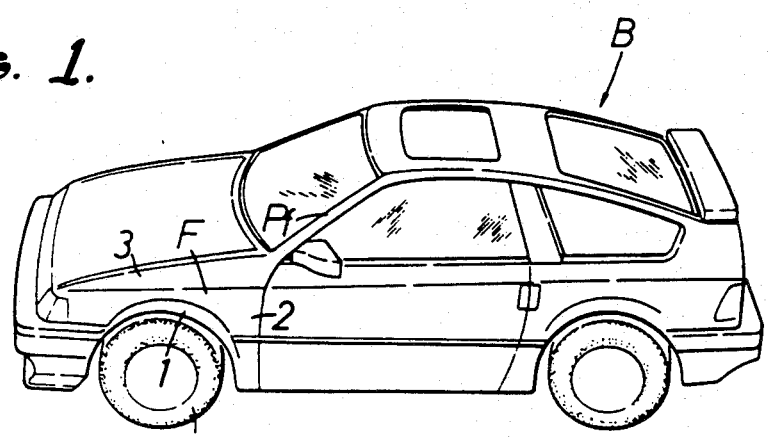
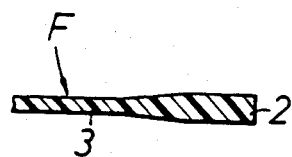
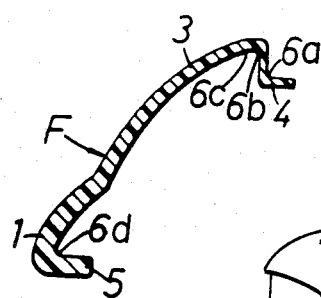
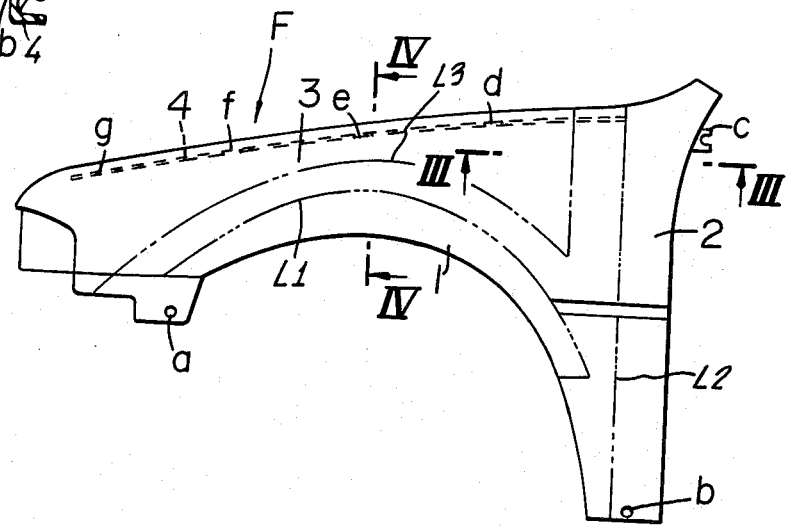

MOLDED FENDER FOR AUTOMOBILES

The present invention relates to an automotive front fender which is secured to a chassis assembly in a manner to construct a part of a chassis thereby to cover a front wheel and, in particular, to a fender formed of synthetic resin for various advantages.

In order to reduce the weight of the automotive chassis as a whole, generally speaking, it is conceivable to adopt a front fender made of a synthetic resin in place of sheet steel. However, a front fender of a synthetic resin of the same shape and uniform thickness as a sheet steel fender would be inferior in the shock strength to that of the sheet steel. Specifically, both the arched portion extending along the upper face of the front wheel and the rear end portion positioned at the side of a front pillar have no portion to be attached to the chassis assembly but their respective two ends. This results in a disadvantage that damaging strains are liable to occur if a shock loading is applied to the arched portion or the rear end portion from the outside.

Moreover, problems arise in the molding of a front fender of this type of a polycarbonate resin or a blend to include thickened portions for taking shock resistance into consideration. Since that resin has a high viscosity, the various flows of the molten resin intersect each other in dependence upon the direction of the gates of the mold to form weld marks at the intersections, which disadvantageously have their shock strengths degraded.

In view of the background thus far described, therefore, the present invention has an object to provide the front fender of the aforementioned type, which can be freed from the disadvantage of the prior art by improving the shock strengths of the entire fender and the method of moding the fender to eliminate defects.

A further object of this invention is to provide a molded front fender having thickened portions at the arch over the wheel and at the rear for shock resistance and across the widest portion of the fender for even distribution of the resin during molding.

Other and more detailed objects and advantages of this invention will appear from the following specification and the accompanying drawings, wherein:

FIG. 1 is a perspective view of an automobile incorporating the front fender of this invention.

FIG. 2 is a side elevation of the front fender of this invention.

FIG. 3 is a section taken substantially on the line III—III of FIG. 2.

FIG. 4 is a section taken substantially on the line IV—IV of FIG. 2.

Figure 5:
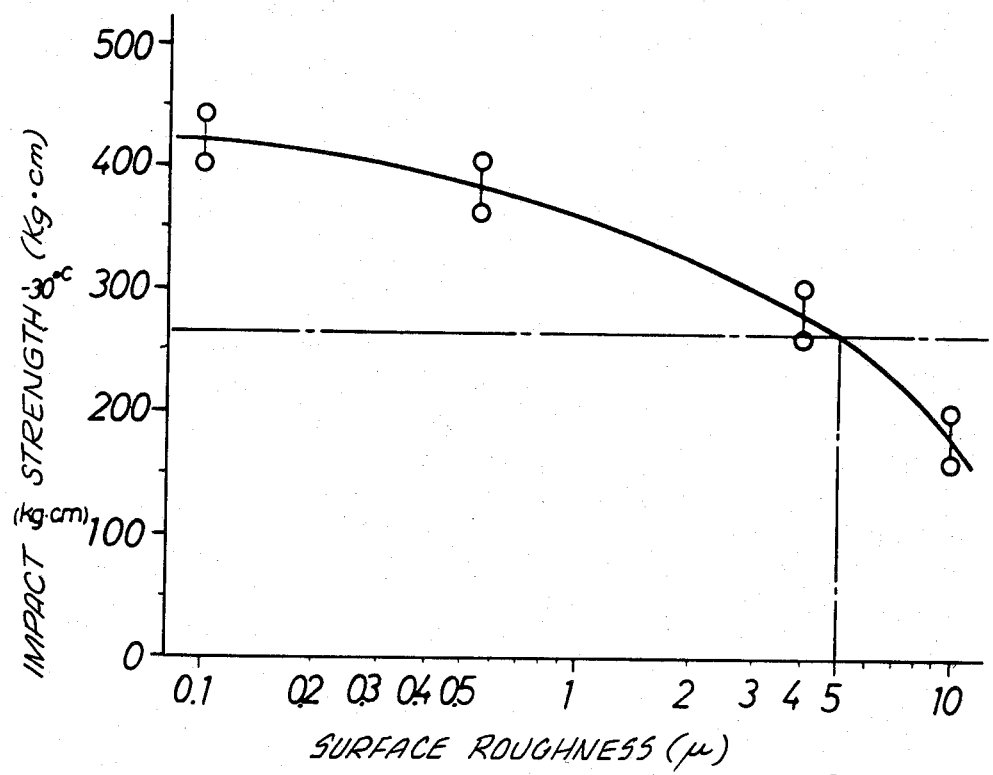
FIG. 5 is a graph illustrating the relationship between the surface roughness and the DuPont impact valve.
Figure 6:
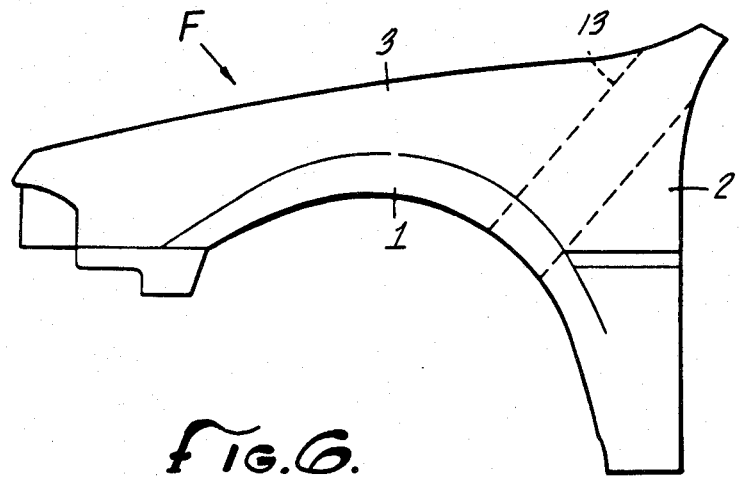
FIG. 6 is another side elevation of a front fender of this invention incorporating thickened portion for improved molding in accordance with this invention.

Referring now to FIG. 1, the front fender F is secured to a chassis assembly B in a manner to form an integral part of the construction of the vehicular chassis and to cover the front wheel Wf.

The front fender F is monolithically molded of a thermo-plastic synthetic resin or the like having a relatively excellent shock resistance, for example, a polycarbonate resin, a polycarbonate alloy resin or a polycarbonate ABS resin. The front fender F is composed of a thick arched portion 1 extending longitudinally in a band shape along the upper face of the front wheel Wf and extending to the phantom line L1, a thick rear end portion 2 extending vertically in a band shape defined by the edge and phantom line L2 and positioned at the side of the front pillar Pf of the chassis assembly B, and a fender body portion 3 defined by phantom line L3 made thinner than the arched portion 1 and the rear end portion 2 and occupying the front fender F except the arched portion 1 and the rear end portion 2. The fender body portion 3 is gradually thickened in the areas between the phantom lines to merge into the arched portion 1 and the rear end portion 2.

With the construction thus far described, the shock resistance of the arched portion 1 and the rear end portion 2 is enhanced, and stress concentration due to the difference in thickness in the portion connecting the two portions 1 and 2 and the fender body portion 3 is prevented so that the shock strength of the front fender F is improved.

The fender body portion 3 is formed inside of its upper edge with an attaching bent portion 4 having a generally hooked cross-section. Similarly, the arched portion 1 is formed inside of its lower edge with a reinforcing bent portion 5. These bent portions 4 and 5 have their inside corners $6a$ to $6d$ formed into arcuate sections having radii not less than 0.5 mm. As a result, when a shock load is applied to the front fender F, stress concentrations at the inside corners $6a$ to $6d$ are avoided, thereby preventing cracks, breaks, and so on, in the fender. This is confirmed by the experimental result that similar stress concentrations were found to crack and break the respective inside corners $6a$ to $6d$ in cases where the arcuate sections were made to have radii of 0.4 mm. or less.

The radii of the arcuate sections of the respective inside corners $6a$ to $6d$ are set in the aforementioned strict manner to eliminate the portions where the stresses concentrate, in order to allow the aforementioned polycarbonate resin or the like, which has a relatively excellent shock resistance, to sufficiently exhibit its characteristics.

Generally speaking, the cavity wall face of the mold for molding the front fender F is finished highly precisely to have a surface roughness of about $0.3\mu$ or less so that the outer surface of the front fender F may have its appearance improved. Since the inner surface of the front fender F is not seen from the outside, however, the corresponding cavity face is made rough. In cases where a shock load is applied to the outer surface of the front fender F, the inner surface of the front fender F is stressed so that its roughness exerts intense influences upon the shock strength of the front fender F. FIG. 5 illustrates the case in which the DuPont impact tests were conducted at $-30$ C. by varying the roughness of the inner surface of a flat test piece made of a polycarbonate resin and having a thickness of 3 mm and an outer surface roughness of $0.1\mu$. As is apparent from FIG. 5, it is necessary to make the inner surface roughness not higher than $5\mu$ so that a DuPont impact value of 270 to 300 Kg·cm may be ensured. In the present invention, the cavity surfaces of the mold are finished so highly precisely that the aforementioned surface roughness may be ensured.

Techniques for measurement of, and the definition of, surface roughness are well known and standard in the art. For example, Mark Standard Handbook for Mechanical Engineers, 8th Edition (McGraw Hill, 1977) teaches the definition of surface roughness as the arithmetic average deviation of the minute surface irregularities from a hypothetical perfect surface. (See e.g. page 13-75 to 13-77).

The front fender F having the construction thus far described is attached to the chassis assembly B at all seven portions: the leading end "a" of the arched portion 1, the rear end of the arched portion 1 through, for example, the rear end "b" of the rear end portion 2, the upper end "c" of the rear end portion 2, and four points "d" to "g" of the attaching bent portion 4.

Figure 7:
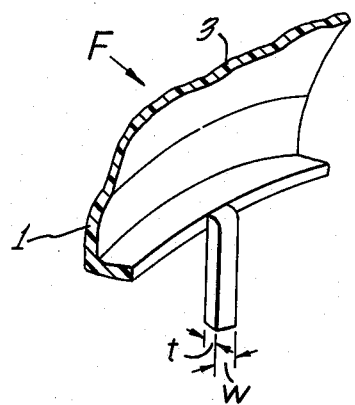
FIG. 7 is a perspective view of a portion of the fender in the as molded condition before finishing.
Figure 9:
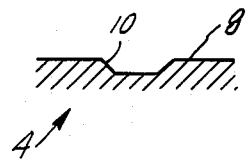
FIG. 9 is a section taken on the line IX—IX of FIG. 8.
Figure 8:
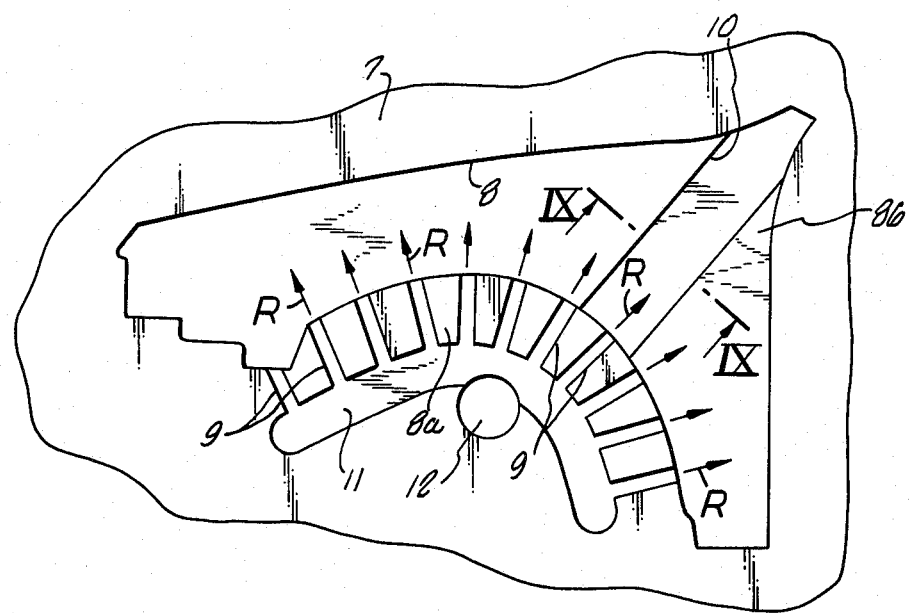
FIG. 8 is a plan view of the mold for the fender of this invention.

Turning now to the preferred method of forming the front fender F as thus far described, a mold 7 is formed, as shown in FIG. 8, with a cavity 8 which has a shape corresponding to the profile of the front fender F. In portion 8a of the cavity 8 for forming the arched portion 1, a plurality of gates 9 are formed which are arranged at predetermined intervals along the arched face of the arched portion forming portion 8a. Each of the gates 9 is formed to have a width w of 10 to 20 mm and a thickness t of 3 to 5 mm, for example, as shown in FIG. 7.

Moreover, the cavity 8 is formed with a reinforcing rib forming groove 10 which extends along the longest radial portion of the fender from the arched portion forming portion 8a to the cavity end wall, i.e., along the portion extending from the arched portion forming portion 8a to the upper end of the cavity portion 8b for forming the rear end portion 2. Indicated at reference numeral 11 is a runner for providing communication between the respective gates 9 and a sprue 12.

By the arrangement of the respective gates 9 thus far described, a plurality of radial flows R of the molten resin are formed within the cavity 8 during the molding operation so that the adjoining molten resin flows R are likely to melt into each other. As a result, weld marks can be prevented thereby eliminating the disadvantage that the shock resistance is partially degraded. Moreover, a reinforcing rib 13 is formed between the arched portion 1 and the upper end of the rear end portion 2, which is radially spaced the greatest distance from the arched portion 1. As a result, the fragile portion is reinforced by the rib 13 so that the front fender F has an excellent shock strength and the aforementioned weld mark problem is prevented.

Having fully described our invention with reference to a specific embodiment and method, it is to be understood that the scope of our invention shall not be limited thereto but rather shall be of full scope of the appended claims.

What is claimed:

1. An automobile fender molded of a synthetic resin or the like for securing to a chassis to cover a wheel, comprising, a thickened arched portion extending longitudinally in a band along the upper face of the wheel, a thickened portion extending in a band along a vertical edge of said fender to be attached to the chassis, a fender body portion thinner than said bands and comprising the majority of said fender, said fender body portion being gradually thickened to join with said thickened bands and, bent portions having arcuate sections formed on an upper edge of said fender and a lower edge of said thickened arched portion, said bent portions extending inwardly of the fender, said arcuate sections of said bent portions having radii of curvature of not less than 0.5 millimeters.

2. The automobile fender of claim 1 wherein the fender is shaped to comprise a front fender and said thickened portion extending along a vertical edge of said fender is located at a rear edge of said fender and is adapted for connection to the automobile front pillar.

3. The automobile fender of claim 1 wherein the resin or the like for molding the fender is introduced at numerous locations along said arched portion.

4. The automobile fender of claim 1 wherein another integral thickened portion is provided in said fender extending from said arched portion to an upper portion of said thickened portion extending along a vertical edge of said fender which upper edge portion is the most radially remote from said arched portion to provide a reinforcement rib and to facilitate the even flow of resin thereto.

5. The automobile fender of claim 1 wherein the interior surface has a surface roughness of not more than about 5$\mu$.

6. The automobile fender of claim 5 wherein the exterior surface has a surface roughness of about 0.3$\mu$ or less.

* * * * *